United States Patent
Ullyott

(10) Patent No.: US 7,854,582 B2
(45) Date of Patent: Dec. 21, 2010

(54) OPERATION OF AN AIRCRAFT ENGINE AFTER EMERGENCY SHUTDOWN

(75) Inventor: Richard Ullyott, St. Bruno (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 851 days.

(21) Appl. No.: 11/745,828

(22) Filed: May 8, 2007

(65) Prior Publication Data

US 2008/0279675 A1 Nov. 13, 2008

(51) Int. Cl.
*F01D 21/00* (2006.01)

(52) U.S. Cl. ............................. 415/1; 415/68; 415/70; 415/122.1; 60/226.1; 60/792; 60/39.163

(58) Field of Classification Search ................ 415/1, 415/68, 70, 122.1; 60/226.1, 792, 39.162, 60/39.163
See application file for complete search history.

(56) References Cited

U.S. PATENT DOCUMENTS

| | | | |
|---|---|---|---|
| 4,062,185 A * | 12/1977 | Snow | ............... 60/204 |
| 4,062,186 A | 12/1977 | Snow et al. | |
| 5,694,765 A | 12/1997 | Hield et al. | |
| 5,845,483 A * | 12/1998 | Petrowicz | ............... 60/788 |
| 5,867,979 A | 2/1999 | Newton et al. | |
| 6,107,693 A | 8/2000 | Mongia et al. | |
| 6,125,625 A | 10/2000 | Lipinski et al. | |
| 6,467,725 B1 | 10/2002 | Coles et al. | |
| 6,606,864 B2 | 8/2003 | Mackay | |
| 6,672,049 B2 | 1/2004 | Franchet et al. | |
| 6,688,097 B2 | 2/2004 | Chapman et al. | |
| 6,712,314 B2 | 3/2004 | Stephan | |
| 6,825,640 B1 | 11/2004 | Hill et al. | |
| 6,914,344 B2 | 7/2005 | Franchet et al. | |
| 7,188,475 B2 | 3/2007 | McGinley et al. | |
| 7,204,090 B2 | 4/2007 | O'Connor et al. | |
| 2002/0083714 A1 | 7/2002 | Bakholdin | |
| 2002/0099476 A1 | 7/2002 | Hamrin et al. | |
| 2004/0065092 A1 | 4/2004 | Wadia et al. | |
| 2006/0026323 A1 | 2/2006 | Ando | |
| 2006/0042252 A1 | 3/2006 | Derouineau | |
| 2006/0108807 A1 | 5/2006 | Bouiller et al. | |
| 2007/0013195 A1 | 1/2007 | Mukavetz et al. | |

FOREIGN PATENT DOCUMENTS

EP 1050672 11/2000

(Continued)

OTHER PUBLICATIONS

European Search Report of Feb. 9, 2007.

(Continued)

*Primary Examiner*—Igor Kershteyn
(74) *Attorney, Agent, or Firm*—Ogilvy Renault LLP

(57) ABSTRACT

A method of emergency operation of an aircraft turbofan engine during an aircraft flight is provided. The engine includes a fan shaft with a fan, and an electric motor/generator mounted for rotation therewith. The method includes shutting down the engine while allowing the engine to windmill, operating the electric motor/generator to rotate the shaft at a determined windmilling speed which is desired for the fan shaft, and operating the engine at the desired windmilling speed for substantially a remainder of the aircraft flight.

18 Claims, 1 Drawing Sheet

FOREIGN PATENT DOCUMENTS

| WO | 9517591 | 6/1995 |
| WO | WO2005059316 | 6/2005 |
| WO | WO2005054645 | 7/2005 |
| WO | WO2005073519 | 8/2005 |
| WO | WO2005111381 | 11/2005 |

OTHER PUBLICATIONS

International Search Report of PCT/CA2008/000640, Jul. 24, 2008.

* cited by examiner

OPERATION OF AN AIRCRAFT ENGINE AFTER EMERGENCY SHUTDOWN

TECHNICAL FIELD

The invention relates generally to gas turbine engines and, more particularly, to a method of operating such an engine.

BACKGROUND OF THE ART

Occasionally in multi-engine aircraft operation, an event such as a turbofan blade-off event forces shutdown of the engine for the remainder of the flight. The so-called "dead" engine is otherwise largely uncontrollable and represents a drag on the aircraft powered by its remaining engines. In some instances, the engine also presents vibration issues as a result of the windmilling engine, which is dependent on the amount of friction present and the extent of blade damage, among other factors.

There remains a need for improved emergency systems for managing dead windmilling engines during flight and associated methods of operating such an aircraft engine after an emergency shutdown during aircraft flight.

SUMMARY OF THE INVENTION

Provided is a method of emergency operation of an aircraft turbofan engine during an aircraft flight, the engine having a fan shaft with a fan and an electric motor/generator mounted for rotation therewith, the method comprising the steps of: shutting down the engine while allowing the engine to windmill; determining a desired windmilling speed for the fan shaft; operating the electric motor/generator to rotate the shaft at said desired windmilling speed; and operating the engine at the desired windmilling speed for substantially a remainder of the aircraft flight.

There is also provided a method of operating a turbofan engine, the engine having a fan shaft with a fan and an electric motor/generator mounted thereto, the method comprising the steps of: shutting down the engine while allowing the engine to windmill; determining at least one shaft speed to be avoided; and operating the electric motor/generator change a speed of the shaft to avoid said at least one shaft speed to be avoided.

DETAILED DESCRIPTION OF THE PREFERRED EMBODIMENTS

Figure 1:
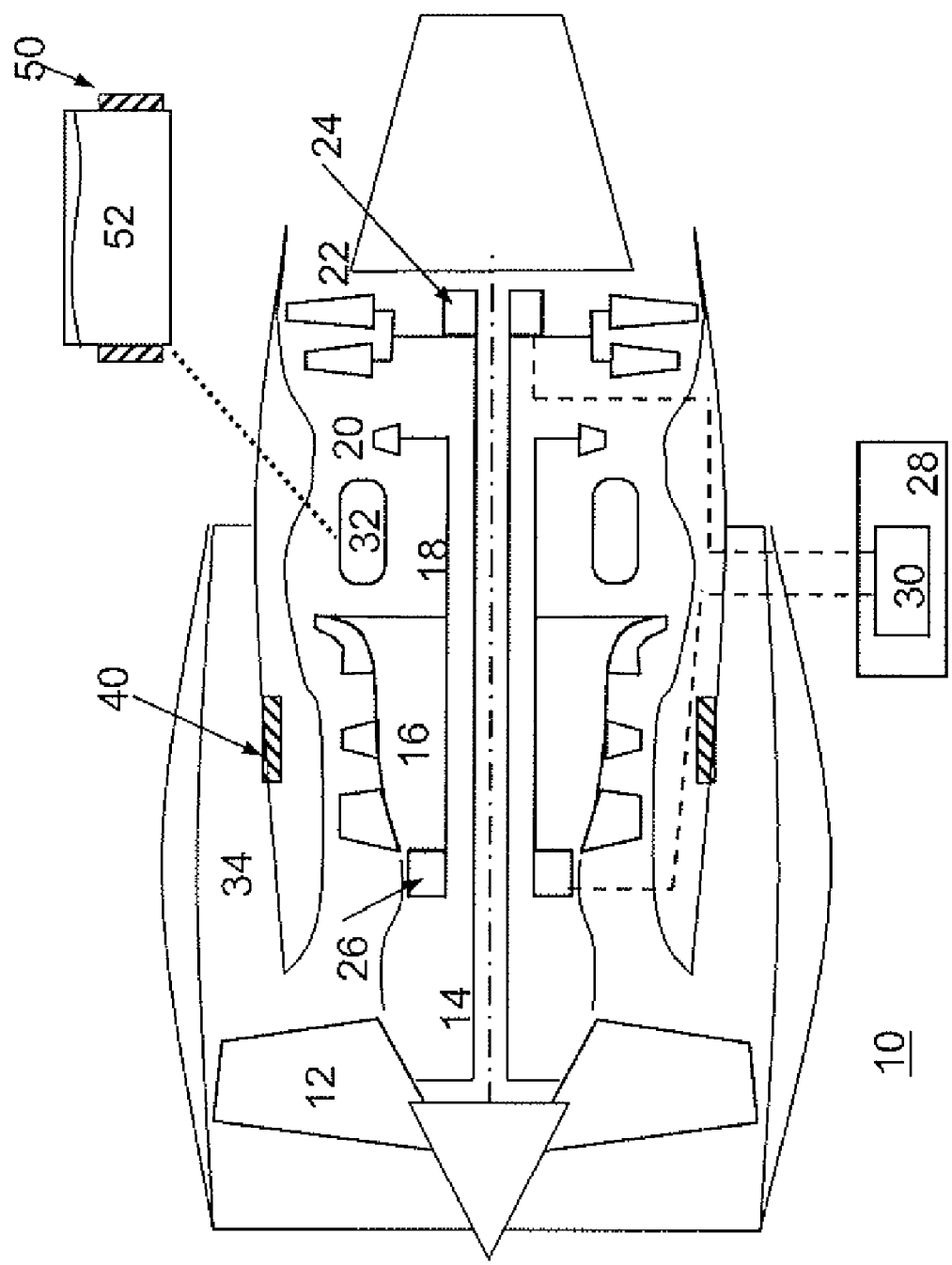
FIG. 1 shows a schematic cross-sectional view of a turbofan gas turbine engine for use with the present method.

A generic gas turbine engine, in this case a turbofan engine 10, is shown in FIG. 1. The engine 10 includes a fan 12 mounted to a fan shaft 14, a compressor 16 mounted to a compressor shaft 18 concentric with the fan shaft 14. Turbine stages 20 and 22 are mounted to the compressor and fan shafts, respectively. A first electric motor/generator 24 has a rotor (not shown) which is mounted for rotation with the fan shaft 14, and a second electric motor/generator 26 has a rotor (not shown) which is mounted for rotation with the compressor shaft 18. An engine controller 28 (e.g. such as an engine full-authority digital engine controller, or FADEC) communicates with various engine subsystems, such as the fuel and ignition systems (not shown), speed sensors (not shown) and so on. Motor/generators 24, 26 are connected to a suitable motor/generator controller system 30. Motor/generators 24, 26 are preferably synchronous permanent magnet machines, preferred for their power density among other things, but any suitable machine configuration may be used. Motor/generators 24, 26 are preferably mounted concentrically and directly (i.e. without reduction gears, etc.) to their respective shafts.

In use, inlet air is propelled into the engine 10 by fan 12, a portion of which air is then further compressed by compressor 16 before being ignited in a combustor 32. After combustion, the combustion gases are expanded successively through turbine stages 20, 22, thereby allowing the engine to extract work from the combustion airflow for driving the compressor 16 and fan 12, respectively. Although a turbofan engine is described, it will be appreciated that other gas turbine engines, such as turboprop, turboshaft and auxiliary power unit (APU) engines, which operate analogously, may be used where suitable with the present approach, instead of a turbofan.

Motor/generators 24, 26 may be operated independently, or in conjunction, to either drive rotation of their respective shafts (e.g. to crank the engine on starting) or to generate electricity when driven by their respective shaft. When operated as a motor driven at an appropriate rate, a motor/generator will accelerate the rotational speed of its respective shaft. When operated as a generator, a motor/generator will generate electricity, however an associated mechanical drag also results on the shaft, which tends to decelerate the shaft (assuming input power is held constant). The amount of shaft acceleration or deceleration is therefore controllable by controlling the electrical requirements of the motor/generator. It has been found that these principles may be employed to improve operation of the engine 10, as will now be described.

For example, the motor/generator(s) may be operated to avoid critical engine speeds or speed ranges, such as by selectively inputting power to a shaft (i.e. in a motoring mode) to accelerate the shaft speed more quickly through a critical speed range, or selectively withdraw power (i.e. in a braking or generating mode) by exerting a load on the shaft, to decelerate the shaft speed more quickly as the shaft passes through a critical speed range. Engine resonances are typically responses to forcing frequencies which typically require some finite time in order to build into a significant resonant response (i.e. reciprocating motion or stress). In other words, resonances need time to develop, however, if the engine moves through a problematic range quickly enough, a natural frequency of concern will not show up if the condition does not have time to manifest in component response.

Therefore, the level of motor input torque or generator braking torque can be appropriately scheduled by the controller 30 to accelerate/decelerate the rotor promptly to a running speed outside the resonant range, thus minimizing the possibility of high cycle fatigue (HCF) cycle accumulation. The controller 30 preferably (though not necessarily) uses shaft speed information, such as may be derived from the engine controller 28 from appropriate shaft speed sensors, or as may be derived from rotor information derived from the motor/generator itself (if such information is available from the motor/generator), to determine when/how the motor/generator(s) should be operated to avoid critical speeds. For example, the controller 30 may compare measured shaft speed against a pre-programmed table of speed ranges to be avoided, and then schedule motor/generator activity accordingly. The amount of time to develop a resonant response may be determined, e.g. during engine design, and as such the amount of acceleration or deceleration required to pass through a speed or speed range without allowing a resonant response to manifest itself is also determinable, and therefore may be provided as an appropriate pre-determined acceleration/deceleration schedule to the control system.

Electrical input power to feed a motor/generator operating in motoring mode may come from any suitable source, such as a generator driven by another engine shaft, engine or auxiliary power unit (APU), or from a battery source, or from an external ground source such as a power grid (in the case of land-based applications), or from any other suitable source.

An electric power sink(s) for taking power from a motor/generator operating in a generating mode (i.e. to decelerate its shaft), may include a motor/generator motoring another spool or engine or APU, or an accessory load such as an engine-mounted pump, or to an output electrical power system, or to a storage system such as a battery or capacitive load bank, or to a load such as a resistive load bank, or any other suitable load.

Referring to FIG. 1, in one embodiment, a resistive load bank (i.e. a heater) 40 in the bypass duct 34 dissipates, as heat into the bypass duct, excess power from a decelerating shaft, to thereby recover otherwise wasted energy from the process and increase thrust increase thrust generated by the bypass flow, as a result. In another embodiment, a suitable heater 50 (not necessarily a resistive heater) is provided adjacent a component, such as a fuel reservoir 52, of an engine fuel system (not depicted), for dissipating excess energy into the fuel used by the engine. Such heat is thus returned to the gas turbine engine cycle, as the fuel is later burned in the engine's combustor, which thereby may extend the flying range of the engine for a given amount of fuel. These and other examples of load banks are described in Applicants' co-pending U.S. patent application Ser. No. 11/269,699, filed Nov. 9, 2005, the entire contents of which is incorporated herein by reference.

Therefore, the present method removes, or at least lessens, the need to provide damping, such as airfoil damping, to impede vibration at critical frequencies, and provides a system which is very responsive to acceleration and deceleration of the motor/generators. As a result, component failures such as cracking, separation and/or distortion resulting from vibratory resonance can be reduced by improved shaft speed management. Additionally, the energy from extracted torque may be consumed elsewhere on the engine/aircraft, or stored for later re-use, thereby aiding the efficiency of the overall system.

In another embodiment, during engine acceleration, controller schedules an increased fuel flow to the combustor, which tends to gradually accelerate the fan and compressor shaft masses. However, in this example, controller 30 initially operates motor/generator 26 and/or 24 (as the case may be) as a generator (i.e. a brake) to momentarily retard acceleration of its associated engine shaft while fuel flow to the combustor increases. This is done for a preset period of time, or for some other period, such as until a predetermined speed or other suitable engine or other condition, etc. is reached, at which point the braking action is released to allow the engine shaft to accelerate towards its "natural" speed (i.e. the speed at which the shaft wants to operate in response to the increased fuel flow). Doing so causes the shaft to accelerate faster than is otherwise would have (since the combustor has been allowed to pre-warm to the higher power setting), which allows the engine shaft to move more quickly, perhaps through a speed range such as a problematic resonance. A similar control sequence may be effected on engine deceleration, where motoring a shaft maintains a shaft speed above a range, while fuel flow is throttled back, and the motoring is then stopped, to allow quicker deceleration through a speed range.

In another embodiment, during engine windmilling after a fan blade-off failure, it is possible to have undesirable resonances set up between the engine and the airframe at certain fan windmilling speeds. In large aircraft applications, in particular, these resonances can be severe enough to make aircraft control difficult. Windmilling speed following a fan blade-off failure is difficult to determine with precision during engine design, since if is dependent on the amount of friction present and the extent of blade damage, among other factors.

However, the motor/generator 24, which is mounted to the fan shaft 14, may be operated in windmilling mode (i.e. after shutting down the engine) to avoid operation of the fan shaft in an undesired speed range, thereby avoiding the problem of windmilling resonance. The speed range(s) to be avoided may be determined by the engine controller 28 based on closed-loop sensor input, for example measuring engine or aircraft vibration, or by other suitable means. The controller logic may continuously monitor engine vibration for an increase or rising trend in vibration amplitude which is either not attributable to other causes, or which exceeds a certain amplitude threshold, or which occurs in a certain frequency range, or any combination thereof. In response, the controller logic instructions activation of the appropriate motor/generator to force a corrective action, such as preventing further acceleration or deceleration of the fan shaft (as the case may be), or by increasing an rate of acceleration/deceleration until a second threshold condition is met, such as a decrease in vibration amplitude, etc. Alternately, or in addition, based on design calculations, certain probable problematic speed ranges may be calculated and provided as a pre-programmed table of speed ranges to be avoided. The control logic therefore monitors shaft speed and instructs appropriate corrective action as a speed range to be avoided approaches. Still alternately, a manual controller may be given to the pilot to permit the pilot to manually intervene to affect shaft speed.

Power from a suitable source (i.e. an APU or remaining active engine generator(s)) may be used to operate motor/generator 24 in a motoring mode to increase speed to avoid the range, or hold a speed constant outside the range, or power may be withdrawn from the shaft, by operating motor/generator 24 in a generating mode to provide electricity to a suitable electric load to provide braking torque to the shaft to avoid the speed range, or prevent increase of shaft speed (e.g. as aircraft speed increases) into the speed range to be avoided. Again, as described above, controller 30 monitors shaft speed and schedules appropriate motor/generator operation according to control logic, or other suitable control mechanism.

In another embodiment, during one-engine inoperative (OEI) windmilling, such as due to an engine flame out (i.e. not necessarily due to a blade-off event), the fan shaft mounted motor/generator 24 is used in conjunction with input power (such as from an APU, etc.) to schedule windmilling speed of the dead engine to reduce drag, and thereby extend the OEI range of the aircraft, as well as aircraft speed and controllability. Such operability can beneficially impact on an aircraft's extended twin-engine operations (ETOPS).

Therefore, motor/generators connected to the main shafts/spools of the gas turbine engine can be used to control engine shaft speed to achieve certain functionality, such as avoiding or preferring certain speed ranges for a shaft, affecting how the shaft speeds up or slows down.

Although the preferred embodiment includes shaft-mounted motor/generators, this invention will work with any motor/generator(s) driven by/driving the engine main shaft(s), such as those mounted to their respective shaft through a gear train or other transmission apparatus. Any suitable gas turbine engine may be used with the present methods. Although the term "speed range" is used in the above description, it will be understood that a speed range may comprise a single speed rather than a range of speeds, per se. Although in the examples provided shaft speed is monitored as part of control function, any other suitable parameter(s) may be used, such as measured vibration, preset time limits, engine temperature, etc. Other changes to the present description will be apparent to the skilled reader, and it will therefore be recognized that the above description is intended to be exemplary of the inventions described, rather than limiting. The inventions are intended to be limited only by the scope of the claims appended.

I claim:

1. A method of emergency operation of an aircraft turbofan engine during an aircraft flight, the engine having a fan shaft with a fan and an electric motor/generator mounted for rotation therewith, the method comprising the steps of:
   shutting down the engine while allowing the engine to windmill;
   determining a desired windmilling speed for the fan shaft, the desired windmilling speed being different from at least one shaft speed determined to be avoided;
   operating the electric motor/generator to rotate the shaft at said desired windmilling speed; and
   operating the engine at the desired windmilling speed for substantially a remainder of the aircraft flight.

2. The method of claim 1 wherein the electric motor/generator is operated as a motor, and wherein electrical power for the electric motor/generator is provided by at least one of a functioning engine of the aircraft, an auxiliary power unit of the aircraft and an energy storage device.

3. The method of claim 1 wherein the step of determining includes determining a desired windmilling speed for the engine by selecting a preprogrammed windmilling speed from a stored memory.

4. The method of claim 3 wherein the preprogrammed windmilling speed is selected to reduce drag of the engine.

5. The method of claim 3 wherein the preprogrammed windmilling speed is selected to avoid a speed range associated with unwanted resonance.

6. The method of claim 1 wherein the step of determining further includes comparing a measured shaft speed to the at least one shaft speed to be avoided.

7. The method of claim 1 wherein the step of determining includes monitoring vibration and determining said at least one shaft speed to be avoided based on said vibration.

8. The method of claim 7 further comprising determining whether the monitored vibration exceeds a preprogrammed amplitude threshold indicative of said at least one shaft speed to be avoided.

9. The method of claim 1 wherein the step of operating the electric motor/generator to rotate the shaft at said desired windmilling speed further comprising increasing the speed of the shaft.

10. The method of claim 9 further comprising operating the electric motor/generator to accelerate the speed of the shaft.

11. A method of operating a turbofan engine, the engine having a fan shaft with a fan and an electric motor/generator mounted thereto, the method comprising the steps of:
    shutting down the engine while allowing the engine to windmill;
    determining at least one shaft speed to be avoided; and
    operating the electric motor/generator to change a speed of the shaft to a desired windmilling speed which is different from said at least one shaft speed to be avoided.

12. The method of claim 11, wherein the at least one shaft speed to be avoided is associated with an unwanted resonance.

13. The method of claim 11, wherein the at least one shaft speed to be avoided is associated with an increased drag condition of the windmilling engine.

14. The method of claim 11 wherein the step of determining includes comparing a measured shaft speed to at least one preprogrammed shaft speed to be avoided.

15. The method of claim 11 wherein the step of determining includes monitoring vibration and determining said at least one shaft speed to be avoided based on said vibration.

16. The method of claim 15 further comprising determining whether the monitored vibration exceeds a preprogrammed amplitude threshold indicative of said at least one shaft speed to be avoided.

17. The method of claim 11 wherein the step of operating the electric motor/generator to change a speed of the shaft further comprising increasing the speed of the shaft.

18. The method of claim 17 further comprising operating the electric motor/generator to accelerate the speed of the shaft.

* * * * *